United States Patent
Heguri et al.

(10) Patent No.: US 8,951,637 B2
(45) Date of Patent: Feb. 10, 2015

(54) METHOD FOR PRODUCING WATER-ABSORBENT RESIN PARTICLES AND WATER-ABSORBENT RESIN PARTICLES

(75) Inventors: Atsushi Heguri, Himeji (JP); Kenji Tanimura, Himeji (JP); Yuichi Onoda, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 77 days.

(21) Appl. No.: 13/878,616

(22) PCT Filed: Nov. 24, 2010

(86) PCT No.: PCT/JP2010/070905
§ 371 (c)(1),
(2), (4) Date: Jun. 11, 2013

(87) PCT Pub. No.: WO2012/053121
PCT Pub. Date: Apr. 26, 2012

(65) Prior Publication Data
US 2013/0260151 A1   Oct. 3, 2013

(30) Foreign Application Priority Data

Oct. 18, 2010  (JP) ................................. 2010-233906

(51) Int. Cl.
*B32B 5/16*    (2006.01)
(52) U.S. Cl.
USPC ........... 428/402; 525/319; 526/230; 526/235; 526/348
(58) Field of Classification Search
USPC ........... 428/402; 525/319; 526/230, 235, 348
See application file for complete search history.

(56) References Cited

U.S. PATENT DOCUMENTS

| | | | |
|---|---|---|---|
| 4,340,706 A | | 7/1982 | Obayashi et al. |
| 4,507,438 A | | 3/1985 | Obayashi et al. |
| 5,180,798 A | * | 1/1993 | Nakamura et al. ............ 526/66 |
| 5,652,309 A | * | 7/1997 | Itoh et al. ................. 525/243 |
| 2006/0194055 A1 | * | 8/2006 | Matsuda et al. ............ 428/402 |
| 2009/0118432 A1 | * | 5/2009 | Fukudome et al. ........ 525/329.9 |
| 2009/0182092 A1 | | 7/2009 | Yokoyama et al. |
| 2010/0331802 A1 | | 12/2010 | Yokoyama et al. |
| 2011/0021712 A1 | | 1/2011 | Gotou et al. |

FOREIGN PATENT DOCUMENTS

| | | | |
|---|---|---|---|
| CN | 1146997 | | 4/1997 |
| CN | 101218260 | | 7/2008 |
| CN | 101479297 | | 7/2009 |
| CN | 101835809 | | 9/2010 |
| JP | 56-131608 | | 10/1981 |
| JP | 3-227301 | | 10/1991 |
| JP | 9-012613 | | 1/1997 |
| JP | 11-279207 | * | 10/1999 |
| JP | 2006-131767 | * | 5/2006 |
| JP | 2006-342306 | * | 12/2006 |
| JP | 2009-132755 | * | 6/2009 |
| TW | 200502259 | | 1/2005 |
| WO | 2004/083284 | | 9/2004 |
| WO | 2007/004529 | | 1/2007 |
| WO | 2009/025235 | | 2/2009 |
| WO | WO2009/025235 | * | 2/2009 |
| WO | 2009/096268 | | 8/2009 |
| WO | WO2009/096268 | * | 8/2009 |

* cited by examiner

*Primary Examiner* — Leszek Kiliman
(74) *Attorney, Agent, or Firm* — Hamre, Schumann, Mueller & Larson, P.C.

(57) ABSTRACT

The present invention provides a method for producing water-absorbent resin particles which show an excellent water absorption rate and high equilibrium swelling capacity and which have an appropriate particle size to be excellent in handleability, and water-absorbent resin particles obtained by the method. The present invention is a method for producing water-absorbent resin particles by reversed phase suspension polymerization of a water-soluble ethylenically unsaturated monomer, the method including the steps of: (A) first reversed phase suspension polymerization of a water-soluble ethylenically unsaturated monomer in a petroleum hydrocarbon dispersion medium using a water-soluble radical polymerization initiator, in the absence of an internal crosslinking agent and in the presence of a surfactant having an HLB of 8 to 12; (B) intermediate crosslinking reaction by adding an intermediate crosslinking agent; (C) second reversed phase suspension polymerization of a water-soluble ethylenically unsaturated monomer added to the petroleum hydrocarbon dispersion medium containing the surfactant dissolved therein using a water-soluble radical polymerization initiator in the absence of an internal crosslinking agent, thereby producing a water-absorbent resin precursor; and (D) post crosslinking reaction of the water-absorbent resin precursor preliminary adjusted to have a moisture content of 30 to 100% by mass relative to a water-soluble ethylenically unsaturated monomer component in the water-absorbent resin precursor.

6 Claims, 1 Drawing Sheet

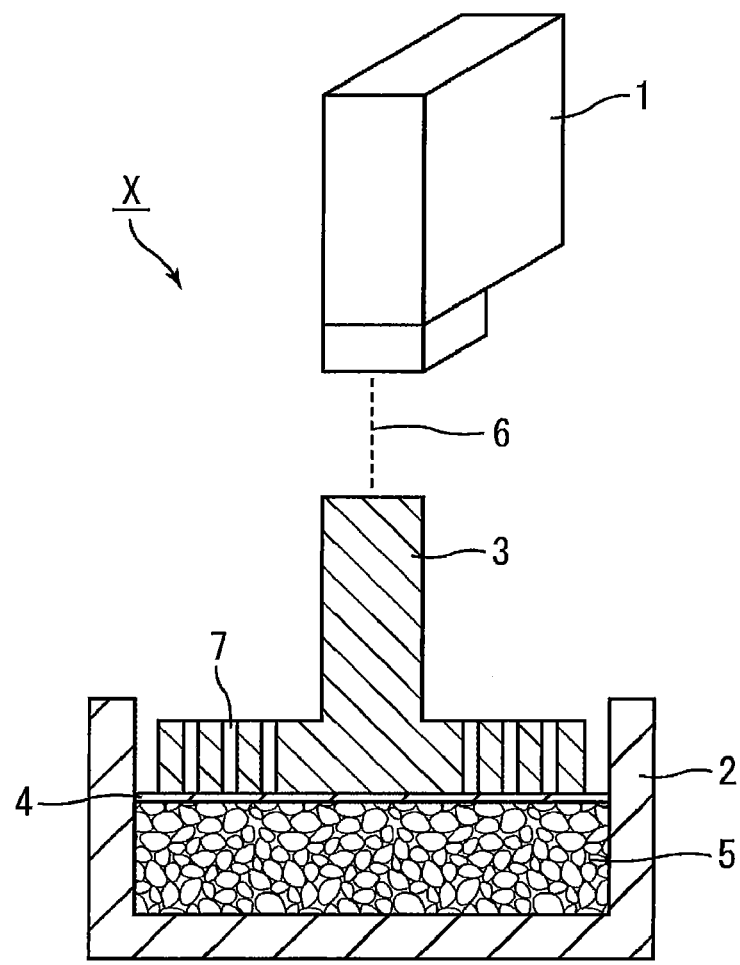

US 8,951,637 B2

METHOD FOR PRODUCING WATER-ABSORBENT RESIN PARTICLES AND WATER-ABSORBENT RESIN PARTICLES

TECHNICAL FIELD

The present invention relates to a method for producing water-absorbent resin particles, and water-absorbent resin particles obtained by the method. More specifically, the present invention relates to a method for producing, under specific production conditions, water-absorbent resin particles which show an excellent water absorption rate and high equilibrium swelling capacity and which have an appropriate particle size to be excellent in handleability, and also relates to water-absorbent resin particles with an excellent water-blocking property obtained by the above method.

BACKGROUND ART

Water-absorbent resin particles are now widely used in various fields such as sanitary items (e.g., disposable diapers, feminine hygiene products), daily products (e.g., pet sheets), agricultural and horticultural materials (e.g., water-retaining materials, soil conditioners), and industrial materials (e.g., water-blocking materials for cables, dewfall preventing materials). Known examples of water-absorbent resin particles used in such applications include: hydrolyzed starch-acrylonitrile graft copolymers, neutralized starch-acrylic acid graft copolymers, saponified vinyl acetate-acrylic acid ester copolymers, and partially neutralized polyacrylic acid. Commonly required properties of water-absorbent resin particles include high water absorption, an excellent water absorption rate, high swelling capacity, and an appropriate median particle size in accordance with applications.

Among these, water blocking materials for cables are formed of two or more liquid-permeable sheets and water-absorbent resin particles that are fixed between the sheets, if needed, using an adhesive and the like. The demand for such water blocking materials has increased with development of electrical industry and communication industry. Water blocking materials for cables are used to wrap the cores of cables such as power cables and optical communication cables, and thereby the cores are protected. Then, the outside of the water blocking materials is covered with materials such as rubber. Thus, cables are formed. If the outer materials of cables such as power cables and optical communication cables are deteriorated to produce cracks therein and moisture enters through the cracks and reaches the cores of the cables, reduction in electric power and communication noise may be caused. The water blocking materials prevent such problems. The water blocking materials absorb such moisture and swell to increase the pressure in the cables, and thereby moisture is prevented from reaching the cores of the cables.

A water-absorbent resin used in water-blocking materials for power cables and communication cables is desired to prevent water immersion from the outside due to damage in cables at an early stage and to maintain the water-blocking effect for a long time. In addition, the water-absorbent resin is also desired to be produced efficiently and to be handled easily in the powder form during the production. Accordingly, for the purpose of realizing these performances, water-absorbent resin particles used in water-blocking materials are required to show high swelling capacity and a high water absorption rate, and to have an appropriate particle size that allows fine handleability.

A method for improving the swelling capacity of water-absorbent resin particles includes controlling the crosslink density of water-absorbent resin particles. For example, a method has been disclosed in which an acrylic acid/acrylate aqueous solution is subjected to reversed phase suspension polymerization in the coexistence of a surfactant having an HLB of 8 to 12, and a crosslinking agent is added thereto (immediately after the polymerization) for a crosslinking reaction (see Patent Literature 1).

Disclosed as a method for producing water-absorbent resin particles which show high water absorption and swelling capacity and which have a small particle size, for example, is reversed phase suspension polymerization of a water-soluble ethylenically unsaturated monomer in which, after first polymerization, a water-soluble ethylenically unsaturated monomer for second polymerization is added to a hydrocarbon solvent containing a surfactant and/or a polymer protective colloid dissolved therein and second polymerization is carried out (see Patent Literature 2).

CITATION LIST

Patent Literature

Patent Literature 1: Japanese Kokai Publication No. Sho-56-131608 (JP-A S56-131608)
Patent Literature 2: WO 2004/083284

SUMMARY OF INVENTION

Technical Problem

Even the method disclosed in Patent Literature 1 is not enough to obtain water-absorbent resin particles having swelling capacity that satisfies the degree recently required for water-blocking material application.

In addition, since water-absorbent resin particles obtained by the method disclosed in Patent Literature 2 have a small particle size, handleability thereof is problematically poor.

The present invention aims to provide a method for producing water-absorbent resin particles which show an excellent water absorption rate and high equilibrium swelling capacity and which have an appropriate particle size to be excellent in handleability, and to provide water-absorbent resin particles prepared by the method.

Solution to Problem

The present invention relates to a method for producing water-absorbent resin particles and water-absorbent resin particles obtained by the method, as described below.

(1) A method for producing water-absorbent resin particles by reversed phase suspension polymerization of a water-soluble ethylenically unsaturated monomer, the method including the steps of: (A) first reversed phase suspension polymerization of a water-soluble ethylenically unsaturated monomer in a petroleum hydrocarbon dispersion medium using a water-soluble radical polymerization initiator, in the absence of an internal crosslinking agent and in the presence of a surfactant having an HLB of 8 to 12; (B) intermediate crosslinking reaction by adding an intermediate crosslinking agent; (C) second reversed phase suspension polymerization of a water-soluble ethylenically unsaturated monomer added to the petroleum hydrocarbon dispersion medium containing the surfactant dissolved therein using a water-soluble radical polymerization initiator in the absence of an internal crosslinking agent, thereby producing a water-absorbent resin precursor; and (D) post crosslinking reaction of the water-absorbent resin precursor preliminary adjusted to have a moisture content of 30 to 100% by mass relative to a water-soluble ethylenically unsaturated monomer component in the water-absorbent resin precursor.

(2) The method for producing water-absorbent resin particles according to (1), wherein the surfactant having an HLB of 8 to 12 is at least one compound selected from the group consisting of a sorbitan fatty acid ester, a polyglycerol fatty acid ester, and a sucrose fatty acid ester.

(3) The method for producing water-absorbent resin particles according to (1) or (2), wherein the intermediate crosslinking agent is a glycidyl ether compound.

(4) The method for producing water-absorbent resin particles according to (1), (2), or (3), wherein the amount of the intermediate crosslinking agent added is 0.0001 to 0.026 mol % relative to the total molar amount of the water-soluble ethylenically unsaturated monomers.

(5) Water-absorbent resin particles produced by the method for producing water-absorbent resin particles according to (1), (2), (3), or (4).

(6) The water-absorbent resin particles according to (5), wherein the water-absorbent resin particles have equilibrium swelling capacity of 12 to 28 mm, a water absorption rate of 1 to 5 seconds, saline retention capacity of 20 to 60 g/g, and a median particle size of 100 to 400 μm.

The present invention is specifically described below.

In the method for producing water-absorbent resin particles of the present invention, a step (A) is first performed in which a water-soluble ethylenically unsaturated monomer is subjected to the first reversed phase suspension polymerization in a petroleum hydrocarbon dispersion medium using a water-soluble radical polymerization initiator in the absence of an internal crosslinking agent and in the presence of a surfactant having an HLB of 8 to 12.

Examples of the water-soluble ethylenically unsaturated monomer include: (meth)acrylic acid ("acryl" and "methacryl" are herein and hereinafter collectively referred to as "(meth)acryl"), 2-(meth)acrylamide-2-methylpropane sulfonic acid and/or an alkaline salt thereof, nonionic monomers such as (meth)acrylamide, N,N-dimethyl(meth)acrylamide, 2-hydroxyethyl(meth)acrylate, N-methylol(meth)acrylamide, and polyethylene glycol mono(meth)acrylate; and amino group-containing unsaturated monomers and quaternary compounds thereof, such as N,N-diethylaminoethyl (meth)acrylate, N,N-diethylaminopropyl(meth)acrylate, and diethylaminopropyl (meth)acrylamide. At least one selected from the above group may be used. Among these water-soluble ethylenically unsaturated monomers, preferred are (meth)acrylic acid or an alkaline salt thereof, (meth)acrylamide, and N,N-dimethylacrylamide, as they are easily available on the industrial scale.

The water-soluble ethylenically unsaturated monomer is generally used in the form of an aqueous solution. The concentration of the water-soluble ethylenically unsaturated monomer in the aqueous solution is preferably within a range of 20% by mass to the saturated concentration. The concentration is more preferably 30 to 45% by mass, and still more preferably 35 to 45% by mass because the state of W/O-type (Water in Oil type) reversed-phase suspension is fine to achieve favorable particle size, and the resulting water-absorbent resin particles has a higher swelling capacity.

In the case where the water-soluble ethylenically unsaturated monomer includes an acid group-containing monomer such as (meth)acrylic acid and 2-(meth)acrylamide-2-methylpropane sulfonic acid, the acid group may be neutralized by an alkaline neutralizer such as alkali metal salts. Examples of the alkaline neutralizer include aqueous solutions of sodium hydroxide, potassium hydroxide, and ammonium hydroxide. Each of these alkaline neutralizers may be used alone or in combination with others.

The neutralization degree of all the acid groups by the alkaline neutralizer is preferably 10 to 100 mol %, more preferably 30 to 90 mol %, and still more preferably 50 to 80 mol % in terms of increasing the osmotic pressure of the resulting water-absorbent resin particles to improve the swelling capacity and avoiding problems in safety and the like caused by the presence of an excess alkaline neutralizer.

Examples of the water-soluble radical polymerization initiator include: persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide; and azo compounds such as 2,2'-azobis[2-(N-phenylamidino)propane]dihydrochloride, 2,2'-azobis[2-(N-allylamidino)propane]dihydrochloride, 2,2'-azobis{2-(1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid). These water-soluble radical polymerization initiators may be used alone or in combination of two or more kinds.

The amount of the water-soluble radical polymerization initiator is commonly 0.005 to 1 mol %, based on the total molar amount of the water-soluble ethylenically unsaturated monomer. The amount of less than 0.005 mol % is not preferable because the polymerization reaction consumes a great deal of time. In contrast, the amount of more than 1 mol % is not preferable because a drastic polymerization reaction is caused.

The above water-soluble radical polymerization initiator can be used as a redox polymerization initiator together with a reducing agent such as sodium sulfite, sodium hydrogen sulfite, ferrous sulfate, and L-ascorbic acid.

In addition, in order to control the swelling capacity of the water-absorbent resin particles, a chain transfer agent may be added. As the chain transfer agent, hypophosphites, thiols, thiolic acids, secondary alcohols, amines and the like can be exemplified.

In the method for producing water-absorbent resin particles of the present invention, the water-soluble ethylenically unsaturated monomer is subjected to the first reversed phase suspension polymerization in a petroleum hydrocarbon dispersion medium using a water-soluble radical polymerization initiator in the absence of an internal crosslinking agent and in the presence of a surfactant having an HLB of 8 to 12.

In aqueous polymerization, a polymerization reaction in the absence of an internal crosslinking agent can improve the swelling capacity, especially the equilibrium swelling capacity, of water-absorbent resin particles. However, the water-absorbent resin precursor obtained through the polymerization is significantly viscous and hardly cut, leading to a considerable load in the following drying and crushing steps. As a result, it is difficult to obtain water-absorbent resin particles having favorable swelling capacity and an appropriate particle size by aqueous polymerization.

Further, in conventional reversed phase suspension polymerization, though a water-absorbent resin precursor is obtainable by a polymerization reaction using no internal crosslinking agent, agglomerates may be partially formed and particles are likely to be adhered to each other to be aggregated in the drying step.

As a result of intensive studies, the present inventors found that reversed phase suspension polymerization using a specific surfactant, a petroleum hydrocarbon dispersion medium, and a water-soluble ethylenically unsaturated monomer aqueous solution in the absence of an internal crosslinking agent more easily produces particles suitably used for water-blocking materials. In addition, the present inventors found that the resulting particles subjected to a specific crosslinking reaction and a post crosslinking reaction are formed into high-performance water-absorbent resin particles suitably used for water-blocking materials, thereby completing the present invention.

In the present invention, the internal crosslinking agent refers to a compound contributing to formation of a crosslinked structure among polymer chains during polymerization of monomers. Specific examples include a compound having at least two polymerizable unsaturated groups that are polymerizable with the water-soluble ethylenically unsaturated monomer in a molecule, and a compound having, in a molecule, at least two functional groups that are reactive with a functional group (e.g. carboxyl group in the case of acrylic acid) contained in the water-soluble ethylenically unsaturated monomer.

In the present invention, a surfactant having an HLB of 8 to 12 is used. Use of the surfactant having an HLB of 8 to 12 improves the state of W/O-type reversed-phase suspension, resulting in production of particles having a favorable particle size. The surfactant preferably has an HLB of 8.5 to 10.5.

Examples of the surfactant include nonionic surfactants such as sorbitan fatty acid esters, (poly)glycerol fatty acid esters, (the expression "(poly)" herein and hereinafter indicates both a case in which the prefix "poly" is placed before the term and a case in which "poly" is not placed before the term), sucrose fatty acid esters, polyoxyethylene sorbitan fatty acid esters, polyoxyethylene glycerine fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallylformaldehyde condensed polyoxyethylene ethers, polyoxyethylene polyoxypropylene block copolymers, polyoxyethylene polyoxypropyl alkyl ethers, and polyethylene glycol fatty acid esters; and anionic surfactants such as fatty acid salts, alkylbenzene sulfonates, alkyl methyl taurates, polyoxyethylene alkyl phenyl ether sulfates, polyoxyethylene alkyl ether sulfonates, polyoxyethylene alkyl ether phosphates, and polyoxyethylene alkyl allyl ether phosphates. Among these, sorbitan fatty acid esters, polyglycerol fatty acid esters, and sucrose fatty acid esters are preferred because they improve the state of the W/O reversed-phase suspension and provide water-absorbent resin particles with a favorable particle size, and they are easily available on the industrial scale. In particular, sorbitan fatty acid esters are more preferred in terms of the absorption rate of the resulting water-absorbent resin particles. Each of these surfactants may be used alone, or two or more of these may be used in combination.

In order to stabilize the state of the W/O reversed-phase suspension and select the efficient amount for a suspension stabilization effect, the amount of the surfactant is preferably 0.1 to 5 parts by mass, more preferably 0.2 to 3 parts by mass, and still more preferably 0.3 to 2 parts by mass, based on 100 parts by mass of the aqueous solution of the water-soluble ethylenically unsaturated monomer which is to be subjected to the first reversed phase suspension polymerization.

In the present invention, a polymer protective colloid may be used together with the surfactant in order to stabilize the state of the W/O reversed-phase suspension. Examples of the polymer protective colloid include maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethyl cellulose, and ethyl hydroxyethyl cellulose. Among these, maleic anhydride-modified polyethylene, maleic anhydride-modified polypropylene, maleic anhydride-modified ethylene-propylene copolymer, oxidized polyethylene, and ethylene-acrylic acid copolymer are preferred in view of stability of the W/O reversed-phase suspension. Each of these polymer protective colloids may be used alone, or two or more of these may be used in combination.

In order to stabilize the state of the W/O reversed-phase suspension and select the efficient amount for a suspension stabilization effect, the amount of the polymer protective colloid is preferably 0.1 to 5 parts by mass, more preferably 0.2 to 3 parts by mass, and still more preferably 0.3 to 2 parts by mass, based on 100 parts by mass of the aqueous solution of the water-soluble ethylenically unsaturated monomer which is to be used in the first reversed phase suspension polymerization.

Examples of the petroleum hydrocarbon dispersion medium include aliphatic hydrocarbons such as n-hexane, n-heptane, and ligroin; alicyclic hydrocarbons such as cyclopentane, methylcyclopentane, cyclohexane, and methylcyclohexane; and aromatic hydrocarbons such as benzene, toluene, and xylene. Each of these may be used alone, or two or more of these may be used in combination. Among these, n-hexane, n-heptane, and cyclohexane are preferred because they are easily available on the industrial scale. Particularly, n-heptane is more preferred because the state of the W/O reversed-phase suspension of the present invention is improved, particles with a favorable particle size are provided, and the resulting water-absorbent resin particles have good water-absorption capacity.

In order to appropriately remove heat of polymerization for easy control of the polymerization temperature, the amount of the petroleum hydrocarbon dispersion medium is preferably 50 to 600 parts by mass and more preferably 100 to 550 parts by mass, based on 100 parts by mass of the water-soluble ethylenically unsaturated monomer which is to be subjected to reversed phase suspension polymerization.

In the present invention, the reaction temperature of the first reversed phase suspension polymerization differs depending on the kind of the water-soluble radical polymerization initiator to be used, and therefore cannot be unconditionally determined. Generally, the reaction temperature is preferably 20 to 110° C. and more preferably 40 to 90° C. in order to shorten the polymerization time by allowing the polymerization to rapidly progress, to easily remove heat of polymerization, and to allow the reaction to progress smoothly. The reaction time is commonly 0.5 to 4 hours.

In the method for producing water-absorbent resin particles of the present invention, the step (B) is subsequently performed in which an intermediate crosslinking reaction is carried out by adding an intermediate crosslinking agent. In this step, the water-absorbent resin particles resulting from the first reversed phase suspension polymerization are crosslinked so that the polymerized particles do not absorb the water-soluble ethylenically unsaturated monomer added in the later-described step (C), thereby preventing the problems caused by such absorption including a change in the surface state of the water-absorbent resin particles and deterioration in water absorption capacity. In other words, lowering in the water absorption rate and deterioration in the swelling capacity are avoided.

It is to be noted that the step (B) and the later-described step (C) are performed at least once, and may be performed twice or more times as needed.

Examples of the intermediate crosslinking agent used in the intermediate crosslinking reaction of the step (B) include: polyols such as ethylene glycol, propylene glycol, 1,4-butanediol, trimethylolpropane, glycerol, polyoxyethylene glycol, polyoxypropylene glycol, and polyglycerol; glycidyl ether compounds such as (poly)ethylene glycol diglycidyl ether, (poly)propylene glycol diglycidyl ether, and (poly)glycerol diglycidyl ether; haloepoxy compounds such as epichlorohydrin, epibromohydrin, and α-methyl epichlorohydrin; compounds having at least two reactive functional groups such as isocyanate compounds (e.g., 2,4-tolylene diisocyanate, hexamethylene diisocyanate); oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide.

Among these intermediate crosslinking agents, preferred are diglycidyl ether compounds because of their excellent reactivity. Especially, ethylene glycol diglycidyl ether, propylene glycol diglycidyl ether, glycerol diglycidyl ether, and polyethylene glycol diglycidyl ether are more preferred because of their high water solubility and fine handleability as intermediate crosslinking agents. Still more preferred are ethylene glycol diglycidyl ether and propylene glycol diglycidyl ether because of high water-absorption capacity of the resulting water-absorbent resin particles. Each of these intermediate crosslinking agents may be used alone, or two or more of these may be used in combination.

The amount of the intermediate crosslinking agent used in the step (B) based on the molar amount of the water-soluble ethylenically unsaturated monomer polymerized just before the addition of the intermediate crosslinking agent in the step (B) is preferably 0.0001 to 0.026 mol %, more preferably 0.0005 to 0.021 mol %, and still more preferably 0.0025 to 0.015 mol %. If the amount of the intermediate crosslinking agent is less than 0.0001 mol %, when a later-described water-soluble ethylenically unsaturated monomer is added, polymerized particles absorb the water-soluble ethylenically unsaturated monomer and are subjected to the next polymerization. In such a case, the surface state of the resulting water-absorbent resin particles may change to have the water absorption capacity lowered. In other words, the water absorption rate is likely to be decreased and the swelling capacity is likely to be lowered. In contrast, if the amount of the intermediate crosslinking agent added exceeds 0.026 mol %, the crosslinking reaction may progress too much, lowering the water absorption capacity of the resulting water-absorbent resin particles.

The phrase "the molar amount of the water-soluble ethylenically unsaturated monomer polymerized just before the addition of the intermediate crosslinking agent in the step (B)" indicates the molar amount of the water-soluble ethylenically unsaturated monomer added in the step (A) in the case of the step (B) for the first time, and the molar amount of the water-soluble ethylenically unsaturated monomer added in the preceding step (C) in the case of the step (B) for the second or more time.

The solvent for adding an intermediate crosslinking agent in the step (B) is not particularly limited as long as it can disperse the intermediate crosslinking agent uniformly. The solvent may be water or a hydrophilic organic solvent. Examples of the hydrophilic organic solvent include: lower alcohols such as methylalcohol, ethylalcohol, and isopropyl alcohol; ketones such as acetone and methyl ethyl ketone; ethers such as dioxane and tetrahydrofuran; amides such as N,N-dimethylformamide; and sulfoxides such as dimethyl sulfoxide. Each of these solvents may be used alone, or two or more of these may be used in combination.

The reaction temperature of the intermediate crosslinking reaction in the step (B) is preferably 60° C. or higher, and more preferably in a range of 70° C. to the boiling point of the solvent used in the polymerization. If the reaction temperature is lower than 60° C., the intermediate crosslinking reaction does not readily progress, likely to lower the absorption capacity of the resulting water-absorbent resin.

The reaction time of the intermediate crosslinking reaction in the step (B) differs depending on the reaction temperature and the kind and amount of the intermediate crosslinking agent to be used, and therefore cannot be unconditionally determined. Generally, the reaction time is preferably 1 to 200 minutes, more preferably 5 to 100 minutes, and still more preferably 10 to 60 minutes.

In the method for producing water-absorbent resin particles of the present invention, the step (C) is subsequently performed in which a water-soluble ethylenically unsaturated monomer is added to the petroleum hydrocarbon dispersion medium containing the surfactant dissolved therein, and the second reversed phase suspension polymerization is carried out using a water-soluble radical polymerization initiator in the absence of an internal crosslinking agent, thereby producing a water-absorbent resin precursor.

The phrase "in the absence of an internal crosslinking agent" in the step (C) indicates that an internal crosslinking agent is not added in the polymerization reaction in the step (C).

In the present invention, reversed phase suspension polymerization performed for plural times allows efficient production of water-absorbent resin particles with excellent swelling capacity.

Examples of the water-soluble ethylenically unsaturated monomer used in the step (C) include: (meth)acrylic acid, 2-(meth)acrylamide-2-methylpropane sulfonic acid and/or an alkaline salt thereof, nonionic monomers such as (meth)acrylamide, N,N-dimethyl(meth)acrylamide, 2-hydroxyethyl(meth)acrylate, N-methylol(meth)acrylamide, and polyethylene glycol mono(meth)acrylate; and amino group-containing unsaturated monomers and quaternary compounds thereof such as N,N-diethylaminoethyl(meth)acrylate, N,N-diethylaminopropyl(meth)acrylate, and diethylaminopropyl (meth)acrylamide. At least one selected from the above group may be used. Among these water-soluble ethylenically unsaturated monomers, preferred are (meth)acrylic acid or an alkaline salt thereof, (meth)acrylamide, and N,N-dimethylacrylamide, as they are easily available on the industrial scale.

The water-soluble ethylenically unsaturated monomer is generally used in the form of an aqueous solution. The concentration of the water-soluble ethylenically unsaturated monomer in the aqueous solution is preferably in a range from 20% by mass to the saturated concentration. The concentration is more preferably 30 to 45% by mass, and still more preferably 35 to 45% by mass because the state of W/O-type (Water in Oil type) reversed-phase suspension is fine to achieve favorable particle size, and the resulting water-absorbent resin particles have a higher swelling capacity.

In the case where the water-soluble ethylenically unsaturated monomer used in the step (C) includes an acid group-containing monomer such as (meth)acrylic acid and 2-(meth)acrylamide-2-methylpropane sulfonic acid, the acid group may be neutralized by an alkaline neutralizer such as alkali metal salts. Examples of the alkaline neutralizer include aqueous solutions of sodium hydroxide, potassium hydroxide, and ammonium hydroxide. Each of these alkaline neutralizers may be used alone or in combination with others.

The neutralization degree of all the acid groups by the alkaline neutralizer is preferably 10 to 100 mol %, more preferably 30 to 90 mol %, and still more preferably 50 to 80 mol % in terms of increasing the osmotic pressure of the resulting water-absorbent resin particles to improve swelling capacity, and avoiding problems in safety and the like caused by the presence of excess alkaline neutralizers.

The amount of the water-soluble ethylenically unsaturated monomer added in the step (C) is preferably 50 to 200 parts by mass, more preferably 70 to 180 parts by mass, and still more preferably 90 to 150 parts by mass, based on 100 parts by mass of the water-soluble ethylenically unsaturated monomer polymerized in the step (A). If the amount of the water-soluble ethylenically unsaturated monomer added in the step (C) is less than 50 parts by mass, the productivity relative to the reaction time of polymerization may be lowered. In contrast, if the amount of the water-soluble ethylenically unsaturated monomer added for polymerization reaction in the step (C) is more than 200 parts by mass, though the productivity relative to the reaction time of polymerization is high, the amount of the water-soluble ethylenically unsaturated monomer used in the polymerization is large, leading to difficulty in control of the polymerization reaction.

The water-soluble ethylenically unsaturated monomer used in the step (C) needs to be added in a state where the surfactant is dissolved in the petroleum hydrocarbon dispersion medium in the reaction mixture after the intermediate crosslinking reaction of the step (B). If the water-soluble ethylenically unsaturated monomer is added in a state where the surfactant is not dissolved in the petroleum hydrocarbon dispersion medium, polymerized particles problematically absorb the added water-soluble ethylenically unsaturated monomer to be aggregated and integrated (agglomerated).

The state where "the surfactant is dissolved in the petroleum hydrocarbon dispersion medium" can be created, for example, by controlling the temperature of the reaction mixture after the intermediate crosslinking reaction. The temperature of the reaction mixture differs depending on the kind of the surfactant, and therefore cannot be unconditionally determined. The temperature is, for example, preferably 40 to 65° C. and more preferably 50 to 60° C. If the temperature of the reaction mixture is lower than 40° C., the surfactant may be precipitated to lower the effect of surface activation, causing a case where polymerized particles absorb the added water-soluble ethylenically unsaturated monomer to be aggregated and integrated (agglomerated). In contrast, if the temperature of the reaction mixture is higher than 65° C., there is unpreferably a risk that a polymerization reaction may occur during addition of the water-soluble ethylenically unsaturated monomer.

Examples of the water-soluble radical polymerization initiator used in the step (C) include: persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide; and azo compounds such as 2,2'-azobis[2-(N-phenylamidino)propane]dihydrochloride, 2,2'-azobis[2-(N-allylamidino)propane]dihydrochloride, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid); and the like. Each of these radical polymerization initiators may be used alone or in combination of two or more kinds.

The amount of the water-soluble radical polymerization initiator used in the step (C) differs depending on the kind of the polymerization initiator and reaction conditions, and therefore cannot be unconditionally determined. The amount is commonly 0.005 to 1 mol %, based on the molar amount of the water-soluble ethylenically unsaturated monomer added in the step (A). The amount of less than 0.005 mol % is not preferable because the polymerization reaction consumes a great deal of time. In contrast, the amount of more than 1 mol % is not preferable because a drastic polymerization reaction is caused.

The above water-soluble radical polymerization initiator can be used as a redox polymerization initiator together with a reducing agent such as sodium sulfite, sodium hydrogen sulfite, ferrous sulfate, and L-ascorbic acid.

The polymerization reaction is carried out in the absence of an internal crosslinking agent in the step (C) in order to improve the swelling capacity, especially equilibrium swelling capacity, of the water-absorbent resin particles.

In addition, in order to control the swelling capacity of the water-absorbent resin particles, a chain transfer agent may be used. As the chain transfer agent, hypophosphites, thiols, thiolic acids, secondary alcohols, amines and the like can be exemplified.

In the step (C), the reaction temperature differs depending on the kind of the water-soluble radical polymerization initiator to be used, and therefore cannot be unconditionally determined. Generally, the reaction temperature is preferably 20 to 110° C. and more preferably 40 to 90° C. in order to shorten the polymerization time by allowing rapid progress of the polymerization, to easily remove the heat of the polymerization, and to allow the reaction to progress smoothly. The reaction time is commonly 0.5 to 4 hours.

The shape of the water-absorbent resin precursor obtained from the steps (A) to (C) commonly varies, such as spherical, granular, cataclastic, and crenated forms, and aggregates of these. In the present invention, the water-absorbent resin precursor is preferably in a granular form, and more preferably in a granular form with homogeneous irregularities on the surface, because particles are less likely to be adhered to each other to be aggregated in the drying step and particles with a suitable shape for water-blocking materials are more easily produced.

From the standpoint of controlling the particle size right before a step (D) described later, amorphous silica may be added to form aggregated particles. Examples of the amorphous silica include dry silica and wet silica, and preferably used among these is wet silica.

The amount of the amorphous silica added is preferably 0.0001 to 1 part by mass, more preferably 0.001 to 0.5 parts by mass, and still more preferably 0.01 to 0.2 parts by mass, based on 100 parts by mass of the total amount of the water-soluble ethylenically unsaturated monomers polymerized in the step (A) and step (C).

The total mass of the water-soluble ethylenically unsaturated monomer component in the water-absorbent resin precursor is calculated as a theoretical polymer solids content based on the total mass of the water-soluble ethylenically unsaturated monomer used in the polymerization reaction.

In the method for producing water-absorbent resin particles of the present invention, a step (D) is subsequently performed in which the water-absorbent resin precursor is adjusted to have a moisture content of 30 to 100% by mass relative to the water-soluble ethylenically unsaturated monomer component in the water-absorbent resin precursor and then subjected to a post crosslinking reaction.

A method for adjusting the water-absorbent resin precursor to have a moisture content of 30 to 100% by mass relative to the water-soluble ethylenically unsaturated monomer component in the water-absorbent resin precursor (hereinafter, also simply referred to as primary drying) is not particularly limited. Examples thereof include a method in which azeotropic distillation is conducted for dehydration by heating from the outside in a state where the water-absorbent resin precursor is dispersed in a petroleum hydrocarbon dispersion medium, a method in which the water-absorbent resin precursor is taken out by decantation and subjected to low pressure drying, and a method in which the water-absorbent resin precursor is filtered and subjected to low pressure drying. Particularly preferred is the method in which a water-absorbent resin precursor obtained by polymerization is dispersed in a petroleum hydrocarbon dispersion medium and subjected to azeotropic distillation for dehydration because it is simply carried out in the production process.

After the primary drying, a post crosslinking agent is added to the resulting water-absorbent resin precursor for a post crosslinking reaction. A post crosslinking reaction of the water-absorbent resin precursor obtained as mentioned above under specific conditions provides water-absorbent resin particles with excellent swelling capacity.

The post crosslinking agent is a compound having, in a molecule, at least two functional groups reactive with a functional group (e.g., carboxyl group in the case of acrylic acid) contained in the water-soluble ethylenically unsaturated monomer, and is preferably a water-soluble compound. Examples thereof include: polyols such as ethylene glycol, propylene glycol, 1,4-butanediol, trimethylolpropane, glycerol, polyoxyethylene glycol, polyoxypropylene glycol, and polyglycerol; glycidyl ether compounds such as (poly)ethylene glycol diglycidyl ether, (poly)propylene glycol diglycidyl ether, and (poly)glycerol diglycidyl ether; haloepoxy compounds such as epichlorohydrin, epibromohydrin, and α-methyl epichlorohydrin; compounds having at least two reactive functional groups such as isocyanate compounds (e.g., 2,4-tolylenediisocyanate, hexanemethylenediisocyanate); oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. Each of these may be used alone, or two or more of these may be used in combination.

Among these post crosslinking agents, diglycidyl ether compounds are preferable because of the excellent reactivity. In particular, more preferred are ethylene glycol diglycidyl ether, propylene glycol diglycidyl ether, glycerol diglycidyl ether, and polyethylene glycol diglycidyl ether because of their high water solubility and fine handleability as crosslinking agents. Moreover, still more preferred are ethylene glycol diglycidyl ether and propylene glycol diglycidyl ether because the resulting water-absorbent resin particles have high swelling capacity.

The post crosslinking agent may be the same as or different from the intermediate crosslinking agent.

The amount of the post crosslinking agent added is preferably 0.001 to 3 mol %, more preferably 0.005 to 2 mol %, still more preferably 0.01 to 1 mol %, and particularly preferably 0.02 to 0.5 mol %, relative to the total molar amount of the water-soluble ethylenically unsaturated monomer in the water-absorbent resin precursor. If the amount of the post crosslinking agent added is less than 0.001 mol % relative to the total molar amount of the water-soluble ethylenically unsaturated monomer, the degree of crosslinking is so weak that the water-absorbent resin particles tend to have a viscous surface during water absorption, lowering the initial swelling capacity. In contrast, the amount of more than 3 mol % may lower the water retention capacity of the resulting water-absorbent resin particles, reducing the swelling capacity.

The total molar amount of the water-soluble ethylenically unsaturated monomer component in the water-absorbent resin precursor is calculated based on the total molar amount of the water-soluble ethylenically unsaturated monomers used in the step (A) and step (C).

In the present invention, the water-absorbent resin precursor and the post crosslinking agent are mixed after adjustment of the moisture content of the water-absorbent resin precursor within a specific range. Control of the moisture content during the reaction between the water-absorbent resin precursor and the post crosslinking agent allows the post crosslinking reaction to progress more favorably.

The moisture content of the water-absorbent resin precursor during the post crosslinking step is 30 to 100% by mass, preferably 30 to 90% by mass, and more preferably 35 to 80% by mass relative to the water-soluble ethylenically unsaturated monomer component in the water-absorbent resin precursor. If the moisture content is less than 30% by mass, the post crosslinking agent is not dispersed in the water-absorbent resin precursor uniformly. If the moisture content is more than 100% by mass, crosslinking of the surface layer of the water-absorbent resin precursor is difficult, lowering the performance such as swelling capacity.

The moisture content is calculated as follows. The moisture amount extracted in the primary drying step is subtracted from the moisture amount in the monomer aqueous solution before polymerization. The resulting amount (the moisture amount of the primary-dried gel) and the moisture amount optionally used when the post crosslinking agent is added are summed up, thereby obtaining the moisture amount of the water-absorbent resin precursor. Then, the moisture amount of the water-absorbent resin precursor relative to the mass of the water-soluble ethylenically unsaturated monomer component in the water-absorbent resin precursor is calculated.

The mass of the water-soluble ethylenically unsaturated monomer component in the water-absorbent resin precursor is calculated as a theoretical polymer solids content based on the total mass of the water-soluble ethylenically unsaturated monomers used in the step (A) and step (C).

The moisture amount optionally used when the post crosslinking agent is added, relative to the moisture amount of the primary-dried gel is preferably 100:0 to 60:40, more preferably 99:1 to 70:30, still more preferably 98:2 to 80:20, and particularly preferably 98:2 to 90:10 from the standpoint of reasonably shortening the drying step to increase the economic efficiency of the process and dispersing the post crosslinking agent uniformly.

In mixing the water-absorbent resin precursor and the post crosslinking agent, water or a hydrophilic organic solvent may be used as a solvent for dispersing the post crosslinking agent uniformly. Examples of the hydrophilic organic solvent include: lower alcohols such as methyl alcohol, ethyl alcohol, and isopropyl alcohol; ketones such as acetone and methyl ethyl ketone; ethers such as dioxane and tetrahydrofuran; amides such as N,N-dimethylformamide; and sulfoxides such as dimethyl sulfoxide. Each of these may be used alone or optionally mixed with water. Alternatively, two or more of them may be used in combination.

The reaction temperature during a post crosslinking reaction of the water-absorbent resin precursor with the post crosslinking agent is preferably 60° C. or higher, more preferably 70 to 200° C., and still more preferably 80 to 150° C. If the reaction temperature is lower than 60° C., the post crosslinking reaction does not readily progress, requiring a great deal of time for the reaction. In contrast, if the reaction temperature is higher than 200° C., there may be a case where the resulting water-absorbent resin particles are decomposed or colored.

The reaction time of the post crosslinking differs depending on the reaction temperature and the kind and amount of the post crosslinking agent to be used, and therefore cannot be unconditionally determined. Generally, the reaction time is 1 to 300 minutes and preferably 5 to 200 minutes.

The reason why the method of the present invention produces water-absorbent resin particles with high swelling capacity is not clearly revealed. Presumably, the balance in the crosslink density between around the surface and the inside of the water-absorbent resin particles is optimized by the process where a water-absorbent resin precursor produced in the absence of an internal crosslinking agent to have an appropriate particle size is adjusted to have a specific moisture content and subjected to a post crosslinking reaction under specific conditions.

In the present invention, after the post crosslinking reaction in the step (D), a drying step (hereinafter, also referred to as secondary drying) may be performed in which energy such as heat is applied from the outside to remove moisture, the organic solvent, and the like by distillation. Such secondary drying provides water-absorbent resin particles in a powdery form.

A method of the secondary drying is not particularly limited. Examples thereof include a method in which a mixture of resin particles after the post crosslinking reaction dispersed in a petroleum hydrocarbon dispersion medium is distilled so that moisture and the petroleum hydrocarbon dispersion medium are removed at the same time, a method in which resin particles are taken out by decantation and subjected to low pressure drying, and a method in which resin particles are filtered and subjected to low pressure drying. Particularly preferred is the method in which a mixture of resin particles after the post crosslinking reaction dispersed in a petroleum hydrocarbon dispersion medium is distilled so that moisture and the petroleum hydrocarbon dispersion medium are removed at the same time, because it is simply carried out in the production process.

The method for producing water-absorbent resin particles of the present invention allows production of water-absorbent resin particles which show an excellent water absorption rate and high equilibrium swelling capacity and which have an appropriate particle size to be excellent in handleability. Such water-absorbent resin particles are also one aspect of the present invention.

The water-absorbent resin particles of the present invention preferably have equilibrium swelling capacity of 10 to 28 mm. Such high swelling capacity allows prevention of initial water immersion due to cracks in the exterior materials of cables, maintains a waterproofing effect for a long time, and applies an appropriate swelling pressure to a degree that would not promote degradation of cable materials. The equilibrium swelling capacity is more preferably 11 to 24 mm, still more preferably 12 to 20 mm, and particularly preferably 13 to 18 mm.

The water-absorbent resin particles of the present invention preferably have a saline absorption rate of 1 to 10 seconds. Such an excellent water absorption rate allows more rapid prevention of water immersion due to cracks in cables. The water absorption rate is more preferably 1 to 8 seconds, and still more preferably 1 to 5 seconds.

The water-absorbent resin particles of the present invention preferably have a median, particle size of 100 to 400 μm. Such a median particle size of the water-absorbent resin particles maintains favorable handleability as powder during production of water-blocking materials and thins the water-blocking materials. The median particle size is more preferably 120 to 350 μm and still more preferably 130 to 300 μm.

The saline retention capacity of the water-absorbent resin particles of the present invention is not particularly limited, and is preferably 20 to 60 g/g, and more preferably 25 to 55 g/g because a larger water absorption power is preferable.

The equilibrium swelling capacity, saline absorption rate, saline retention capacity, and median particle size of the water-absorbent resin particles of the present invention are determined by the measuring methods in examples described later.

Additives such as heat resistance stabilizers, antioxidants, and antibacterial agents may be added to the water-absorbent resin particles of the present invention in accordance with the applications.

The amount of the additive differs depending on the application of water-absorbent resin particles and the kind of the additive to be used. The amount is preferably 0.001 to 10 parts by mass, more preferably 0.01 to 5 parts by mass, and still more preferably 0.1 to 2 parts by mass relative to 100 parts by mass of the total mass of the water-soluble ethylenically unsaturated monomers added in the step (A) and step (C).

The total mass of the water-soluble ethylenically unsaturated monomer component in the water-absorbent resin precursor is calculated as a theoretical polymer solids content based on the total mass of the water-soluble ethylenically unsaturated monomer used in the polymerization reaction.

Advantageous Effects of Invention

The present invention provides a method for producing water-absorbent resin particles which show an excellent water absorption rate and high equilibrium swelling capacity and which have an appropriate particle size to be excellent in handleability, and also provides water-absorbent resin particles obtained by the method.

BRIEF DESCRIPTION OF DRAWINGS

FIG. 1 is a schematic explanatory view of a swelling capacity measuring apparatus.

DESCRIPTION OF EMBODIMENTS

The present invention is described in detail by means of examples below. The present invention is not limited only to these examples.

Example 1

First Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm for each stage. An amount of 360 g of n-heptane was charged into the flask, and 1.47 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 92 g of a 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution for the first polymerization. The monomer aqueous solution had a mass of the water-soluble ethylenically unsaturated monomer of 91.0 g and a moisture amount of 148.6 g.

The monomer aqueous solution for the first polymerization was added to the separable flask in which the rotation frequency of the stirrer was set to 450 r/min. The system was replaced with nitrogen gas for 30 minutes and heated by immersion in a water bath at 70° C. The first reversed phase suspension polymerization was carried out for one hour.
(Intermediate Crosslinking Reaction)

After the first reversed phase suspension polymerization, added to the resulting reaction mixture was 0.41 g of a 2% by mass ethylene glycol diglycidyl ether aqueous solution (0.000047 mol) as an intermediate crosslinking agent. The mixture was subjected to an intermediate crosslinking reaction at 75° C. for 30 minutes.

Second Reversed Phase Suspension Polymerization

Apart from the monomers for the first polymerization, to a 500-mL Erlenmeyer flask containing 92 g of a 80.5% by mass acrylic acid aqueous solution (1.03 mol) while being cooled in ice, 114.7 g of a 26.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution for the second polymerization. The monomer aqueous solution had a mass of the water-soluble ethylenically unsaturated monomer of 91.0 g and a moisture amount of 115.7 g.

The reaction mixture after the intermediate crosslinking reaction was cooled to 60° C. (state where sorbitan monolaurate is dissolved in n-heptane) with the stirrer set to the rotation frequency of 1000 r/min. The monomer aqueous solution for second polymerization adjusted to 14° C. was dropwise added to the system. While the temperature was maintained at the system temperature when the dropwise addition was completed (47° C.), the system was stirred at the above rotation frequency and replaced with nitrogen gas for 30 minutes. Then, the system was heated by immersion in a water bath at 70° C. The second reversed phase suspension polymerization was carried out for one hour, thereby preparing a water-absorbent resin precursor.
(Post Crosslinking Reaction)

The resulting liquid containing the water-absorbent resin precursor was heated in an oil bath at 120° C. Water and n-heptane were azeotroped while n-heptane was refluxed, thereby extracting 197.3 g of water outside the system. Then, 7.36 g of a 2% by mass ethylene glycol diglycidyl ether aqueous solution (0.00085 mol) was added as a post crosslinking agent. The moisture amount at that time was 74.6 g and the moisture content relative to the water-soluble ethylenically unsaturated monomer component in the water-absorbent resin precursor was 41% by mass. The post crosslinking agent mixture prepared was held at 80° C. for two hours. Then, n-heptane was evaporated for drying, so that 190.5 g of granular water-absorbent resin particles was prepared.

Example 2

A similar operation as in Example 1 was performed, except that 1.24 g of a 2% by mass ethylene glycol diglycidyl ether aqueous solution (0.00014 mol) was used instead of 0.41 g of a 2% by mass ethylene glycol diglycidyl ether aqueous solution (0.000047 mol) as an intermediate crosslinking agent added in the (Intermediate crosslinking reaction) of Example 1, and the amount of water to be extracted outside the system by azeotroping of water and n-heptane in the (Post crosslinking reaction) of Example 1 was changed from 197.3 g to 198.1 g (the moisture content relative to the water-soluble ethylenically unsaturated monomer component in the water-absorbent resin precursor was 41% by mass). In this manner, 188.5 g of granular water-absorbent resin particles was prepared.

Example 3

A similar operation as in Example 1 was performed, except that the reaction mixture after the intermediate crosslinking reaction was cooled to 50° C., not to 60° C., in the (Second reversed phase suspension polymerization) of Example 1, and the system temperature after the dropwise addition was changed from 47° C. to 41° C. (the moisture content relative to the water-soluble ethylenically unsaturated monomer component in the water-absorbent resin precursor was 41% by mass). In this manner, 189.5 g of granular water-absorbent resin particles was prepared.

Example 4

First Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm for each stage. An amount of 400 g of n-heptane was charged into the flask, and 1.30 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 81 g of an 80.5% by mass acrylic acid aqueous solution (0.91 mol) while being cooled in ice, 130.0 g of a 20.9% by mass sodium hydroxide aqueous solution was dropwise added for 75 mol % neutralization. Then, 0.0892 g (0.00033 mol) of potassium persulfate was added and dissolved therein, thereby preparing a monomer aqueous solution for the first polymerization. The monomer aqueous solution had a mass of the water-soluble ethylenically unsaturated monomer of 80.2 g and a moisture amount of 130.9 g.

The monomer aqueous solution for the first polymerization was added to the separable flask in which the rotation frequency of the stirrer was set to 450 r/min. The system was replaced with nitrogen gas for 30 minutes and heated by immersion in a water bath at 70° C. The first reversed phase suspension polymerization was carried out for one hour.
(Intermediate Crosslinking Reaction)

After the first reversed phase suspension polymerization, added to the resulting reaction mixture was 0.36 g of a 2% by mass ethylene glycol diglycidyl ether aqueous solution (0.000041 mol) as an intermediate crosslinking agent. The mixture was subjected to an intermediate crosslinking reaction at 75° C. for 30 minutes.

Second Reversed Phase Suspension Polymerization

Apart from the monomers for the first polymerization, to a 500-mL Erlenmeyer flask containing 81 g of an 80.5% by mass acrylic acid aqueous solution (0.91 mol) while being cooled in ice, 101.0 g of a 26.9% by mass sodium hydroxide aqueous solution was dropwise added for 75 mol % neutralization. Then, 0.0892 g (0.00033 mol) of potassium persulfate was added and dissolved therein, thereby preparing a monomer aqueous solution for the second polymerization. The monomer aqueous solution had a mass of the water-soluble ethylenically unsaturated monomer 80.2 g and a moisture amount of 101.9 g.

The reaction mixture after the intermediate crosslinking reaction was cooled to 60° C. (state where sorbitan monolaurate is dissolved in n-heptane) with the stirrer set to the rotation frequency of 1000 r/min. The monomer aqueous solution for the second polymerization adjusted to 14° C. was dropwise added to the system. While the temperature was maintained at the system temperature when the dropwise addition was completed (50° C.), the system was stirred at the above rotation frequency and replaced with nitrogen gas for 30 minutes. Then, the system was heated by immersion in a water bath at 70° C. The second reversed phase suspension polymerization was carried out for one hour, thereby preparing a water-absorbent resin precursor.
(Post Crosslinking Reaction)

The resulting liquid containing the water-absorbent resin precursor was heated in an oil bath at 120° C. Water and n-heptane were azeotroped while n-heptane was refluxed, thereby extracting 181.8 g of water outside the system. Then, 6.48 g of a 2% by mass ethylene glycol diglycidyl ether aqueous solution (0.00074 mol) was added as a post crosslinking agent. The moisture amount at that time was 57.6 g and the moisture content relative to the water-soluble ethylenically unsaturated monomer component in the water-absorbent resin precursor was 35.9% by mass. The post crosslinking agent mixture prepared was held at 80° C. for two hours. Then, n-heptane was evaporated for drying, so that 164.7 g of granular water-absorbent resin particles were prepared.

Example 5

A similar operation as in Example 1 was performed, except that 0.04 g of amorphous silica powder (Tokuyama Corporation, trade name: TOKUSIL P) was added to the liquid containing the water-absorbent resin precursor obtained after the (Second reversed phase suspension polymerization) of Example 1. In this manner, 188.6 g of aggregated granular water-absorbent resin particles was prepared.

Example 6

A similar operation as in Example 1 was performed, except that the amount of water to be extracted outside the system by azeotroping of water and n-heptane in the (Post crosslinking reaction) of Example 1 was changed from 197.3 g to 120.8 g, and the post crosslinking agent to be added was changed from 7.36 g of a 2% by mass ethylene glycol diglycidyl ether aqueous solution (0.000845 mol) to 1.84 g of a 2% by mass ethylene glycol diglycidyl ether aqueous solution (0.000211 mol) (the moisture content relative to the water-soluble ethylenically unsaturated monomer component in the water-absorbent resin precursor was 80% by mass). In this manner, 191.1 g of granular water-absorbent resin particles was prepared.

Example 7

A similar operation as in Example 1 was performed, except that the amount of water to be extracted outside the system by azeotroping of water and n-heptane in the (Post crosslinking reaction) of Example 1 was changed from 197.3 g to 159.0 g, and the post crosslinking agent to be added was changed from 7.36 g of a 2% by mass ethylene glycol diglycidyl ether aqueous solution (0.000845 mol) to 3.68 g of a 2% by mass ethylene glycol diglycidyl ether aqueous solution (0.000423 mol) (the moisture content relative to the water-soluble ethylenically unsaturated monomer component in the water-absorbent resin precursor was 60% by mass). In this manner, 191.3 g of granular water-absorbent resin particles was prepared.

Comparative Example 1

Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm for each stage. An amount of 453 g of n-heptane was charged into the flask, and 1.90 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 48.5 g of an 80.5% by mass acrylic acid aqueous solution (0.54 mol) while being cooled in ice, 76.7 g of a 22.6% by mass sodium hydroxide aqueous solution was dropwise added for 80 mol % neutralization. Then, 0.13 g (0.00037 mol) of potassium persulfate was added and dissolved therein, thereby preparing a monomer aqueous solution. The monomer aqueous solution had a mass of 48.6 g of the water-soluble ethylenically unsaturated monomer and a moisture amount of 76.6 g.

The monomer aqueous solution was added to the separable flask in which the rotation frequency of the stirrer was set to 700 r/min. The system was replaced with nitrogen gas for 30 minutes and heated by immersion in a water bath at 70° C. The reversed phase suspension polymerization was carried out for one hour.
(Post Crosslinking Reaction)

To the reaction mixture resulting from the reversed phase suspension polymerization, 5.0 g of a 2% by mass ethylene glycol diglycidyl ether aqueous solution (0.00057 mol) was added as a post crosslinking agent. At that time, the moisture amount was 81.5 g and the moisture content was 167.9% by mass relative to the water-soluble ethylenically unsaturated monomer component in the water-absorbent resin precursor. Then, the post crosslinking reaction was carried out at 75° C. for 30 minutes.

Next, the resulting reaction liquid was heated in an oil bath at 120° C. Water and n-heptane were azeotroped while n-heptane was refluxed, thereby extracting 65.0 g of water outside the system. Then, n-heptane was evaporated for drying, so that 50.0 g of granular water-absorbent resin particles was prepared.

Comparative Example 2

Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm. An amount of 453 g of n-heptane was charged into the flask, and 1.104 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 92 g of an 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution. The monomer aqueous solution had a mass of 91.0 g of the water-soluble ethylenically unsaturated monomer and a moisture amount of 148.6 g.

The monomer aqueous solution was added to the separable flask in which the rotation frequency of the stirrer was set to 700 r/min. The system was replaced with nitrogen gas for 30 minutes and heated by immersion in a water bath at 70° C. The reversed phase suspension polymerization was carried out for one hour, thereby preparing a water-absorbent resin precursor.
(Post Crosslinking Reaction)

The liquid containing the obtained water-absorbent resin precursor was heated in an oil bath at 120° C. Water and n-heptane were azeotroped while n-heptane was refluxed, thereby extracting 125.8 g of water outside the system. Then, 5.52 g of a 2% by mass ethylene glycol diglycidyl ether aqueous solution (0.00063 mol) was added as a post crosslinking agent. At that time, the moisture amount was 28.2 g and the moisture content was 31% by mass relative to the water-soluble ethylenically unsaturated monomer component in the water-absorbent resin precursor. After addition of the post crosslinking agent, the liquid was held at 80° C. for two hours. Then, n-heptane was evaporated for drying, whereby 94.5 g of granular water-absorbent resin particles was prepared.

Comparative Example 3

First Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm for each stage. An amount of 360 g of n-heptane was charged into the flask, and 1.47 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 92 g of an 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution for the first polymerization. The monomer aqueous solution had a mass of 91.0 g of the water-soluble ethylenically unsaturated monomer and a moisture amount of 148.6 g.

The monomer aqueous solution for the first polymerization was added to the separable flask in which the rotation frequency of the stirrer was set to 450 r/min. The system was replaced with nitrogen gas for 30 minutes and heated by immersion in a water bath at 70° C. The first reversed phase suspension polymerization was carried out for one hour.
(Intermediate Crosslinking Reaction)

After the first reversed phase suspension polymerization, added to the resulting reaction mixture was 5.0 g of a 2% by mass ethylene glycol diglycidyl ether aqueous solution (0.00057 mol) as an intermediate crosslinking agent. The mixture was subjected to an intermediate crosslinking reaction at 75° C. for 30 minutes.

Second Reversed Phase Suspension Polymerization

Apart from the monomers for the first polymerization, to a 500-mL Erlenmeyer flask containing 92 g of an 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution for the second polymerization. The monomer aqueous solution had a mass of 91.0 g of the water-soluble ethylenically unsaturated monomer and a moisture amount of 148.6 g.

The reaction mixture after the intermediate crosslinking reaction was cooled to 60° C. (state where sorbitan monolaurate is dissolved in n-heptane) with the stirrer set to the rotation frequency of 1000 r/min. The monomer aqueous solution for the second polymerization adjusted to 14° C. was dropwise added to the system. While the temperature was maintained at the system temperature when the dropwise addition was completed (47° C.), the system was stirred at the above rotation frequency and replaced with nitrogen gas for 30 minutes. Then, the system was heated by immersion in a water bath at 70° C. The second reversed phase suspension polymerization was carried out for one hour, thereby preparing a water-absorbent resin precursor.
(Post Crosslinking Reaction)

To the reaction mixture containing the resulting water-absorbent resin precursor, 5.0 g of a 2% by mass ethylene glycol diglycidyl ether aqueous solution (0.00057 mol) was added as a post crosslinking agent. At that time, the moisture amount was 163.6 g and the moisture content was 169.5% by mass relative to the water-soluble ethylenically unsaturated monomer component in the water-absorbent resin precursor. Then, the post crosslinking reaction was carried out at 75° C. for 30 minutes.

Next, the resulting reaction liquid was heated in an oil bath at 120° C. Water and n-heptane were azeotroped while n-heptane was refluxed, thereby extracting 125.0 g of water outside the system. Then, n-heptane was evaporated for drying, so that 190.7 g of granular water-absorbent resin particles was prepared.

Comparative Example 4

A similar operation as in Example 1 was performed, except that ethylene glycol diglycidyl ether as an intermediate crosslinking agent was not added after the (First reversed phase suspension polymerization) of Example 1.

However, the load on the stirrer during addition of the monomer aqueous solution for the second polymerization became too large to continue stirring. Accordingly, the later steps were not carried out.

Comparative Example 5

First Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller that has four pitched blades with a blade size of 50 mm for each stage. An amount of 340 g of n-heptane was charged into the flask, and 0.92 g of sucrose fatty acid ester (Mitsubishi-Kagaku Foods Corporation, trade name: S-370) having an HLB of 3.0 was added thereto as a surfactant. The contents were heated to 80° C. so that the surfactant was dissolved therein, and then the inner temperature was cooled to 35° C.

Separately, to a 500-mL Erlenmeyer flask containing 92 g of an 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.092 g (0.00034 mol) of potassium persulfate was added and dissolved therein, thereby preparing a monomer aqueous solution for the first polymerization. The monomer aqueous solution had a mass of 91.0 g of the water-soluble ethylenically unsaturated monomer and a moisture amount of 148.6 g.

The monomer aqueous solution for the first polymerization was added to the separable flask in which the rotation frequency of the stirrer was set to 700 r/min. The system was replaced with nitrogen gas for 30 minutes and heated by immersion in a water bath at 70° C. The first reversed phase suspension polymerization was carried out for one hour.

(Intermediate Crosslinking Reaction)

After the first reversed phase suspension polymerization, added to the resulting reaction mixture was 0.41 g of a 2% by mass ethylene glycol diglycidyl ether aqueous solution (0.000047 mol) as an intermediate crosslinking agent. The mixture was subjected to an intermediate crosslinking reaction at 75° C. for 30 minutes.

Second Reversed Phase Suspension Polymerization

Apart from the monomers for the first polymerization, to a 500-mL Erlenmeyer flask containing 92 g of an 80.5% by mass acrylic acid aqueous solution (1.03 mol) while being cooled in ice, 147.6 g of 20.9% by mass sodium hydroxide aqueous solution was dropwise added for 75 mol % neutralization. Then, 0.092 g (0.00034 mol) of potassium persulfate was added and dissolved therein, thereby preparing a monomer aqueous solution for the second polymerization. The monomer aqueous solution had a mass of 91.0 g of the water-soluble ethylenically unsaturated monomer and a moisture amount of 148.6 g.

The reaction mixture after the intermediate crosslinking reaction was cooled to 50° C. (state where sucrose fatty acid ester is dissolved in n-heptane) with the stirrer set to the rotation frequency of 1000 r/min. The monomer aqueous solution for the second polymerization adjusted to 14° C. was dropwise added to the system. While the temperature was maintained at the system temperature when the dropwise addition was completed (47° C.), the system was stirred at the above rotation frequency and replaced with nitrogen gas for 30 minutes. Then, the system was heated by immersion in a water bath at 70° C. The second reversed phase suspension polymerization was carried out for one hour, thereby preparing a water-absorbent resin precursor.

(Post Crosslinking Reaction)

The resulting liquid containing the water-absorbent resin precursor was heated in an oil bath at 120° C. Water and n-heptane were azeotroped while n-heptane was refluxed, thereby extracting 250.0 g of water outside the system. Then, 5.5 g of a 2% by mass ethylene glycol diglycidyl ether aqueous solution (0.000631 mol) was added as a post crosslinking agent. At that time, the moisture amount was 52.9 g and the moisture content was 29.1% by mass relative to the water-soluble ethylenically unsaturated monomer component in the water-absorbent resin precursor. After addition of the post crosslinking agent, the liquid was held at 80° C. for two hours. Then, n-heptane and water were removed by heating, thereby preparing 191.1 g of spherical water-absorbent resin particles.

Comparative Example 6

A similar operation as in Example 1 was performed except the following. In the (Intermediate crosslinking reaction) of Example 1, the intermediate crosslinking agent to be added was changed from 0.41 g of a 2% by mass ethylene glycol diglycidyl ether aqueous solution (0.000047 mol) to 1.24 g of a 2% by mass ethylene glycol diglycidyl ether aqueous solution (0.00014 mol). In addition, in the (Second reversed phase suspension polymerization) of Example 1, the reaction mixture after the intermediate crosslinking reaction was cooled to 30° C., not to 60° C., and the system temperature after the dropwise addition was changed from 47° C. to 28° C. (when the monomer aqueous solution for the second polymerization was added to the system, sorbitan monolaurate was not dissolved in n-heptane).

However, the load on the stirrer during addition of the monomer aqueous solution for the second polymerization became too large to continue stirring. Accordingly, the later steps were not carried out.

Comparative Example 7

First Reversed Phase Suspension Polymerization

A separable flask in a shape of a round-bottomed cylinder with an inner diameter of 100 mm was prepared which was equipped with a reflux condenser, an addition funnel, a nitrogen gas inlet tube, and a stirrer including a two-stage paddle impeller (with a surface coated with a fluororesin) that has four pitched blades with a blade size of 50 mm for each stage. An amount of 360 g of n-heptane was charged into the flask, and 1.47 g of sorbitan monolaurate (NOF CORPORATION, trade name: NONION LP-20R) having an HLB of 8.6 was added thereto as a surfactant. The contents were heated to 50° C. so that the surfactant was dissolved therein, and then the inner temperature was cooled to 47° C.

Separately, to a 500-mL Erlenmeyer flask containing 92 g of an 80.5% by mass acrylic acid aqueous solution (1.03 mol) while being cooled in ice, 147.6 g of a 20.9% by mass sodium hydroxide aqueous solution was dropwise added for 75 mol % neutralization. Then, 0.101 g (0.00037 mol) of potassium persulfate and 0.0082 g (0.000047 mol) of ethylene glycol diglycidyl ether were added and dissolved therein, thereby preparing a monomer aqueous solution for the first polymerization. The monomer aqueous solution had a mass of 91.0 g of the water-soluble ethylenically unsaturated monomer and a moisture amount of 148.6 g.

The monomer aqueous solution fore the first polymerization was added to the separable flask in which the rotation frequency of the stirrer was set to 450 r/min. The system was replaced with nitrogen gas for 30 minutes and heated by immersion in a water bath at 70° C. The first reversed phase suspension polymerization was carried out for one hour.

Second Reversed Phase Suspension Polymerization

Apart from the monomers for the first polymerization, to a 500-mL Erlenmeyer flask containing 92 g of an 80.5% by mass acrylic acid aqueous solution (1.03 mol) while being cooled in ice, 114.7 g of a 26.9% by mass sodium hydroxide aqueous solution was dropwise added for 75 mol % neutralization. Then, 0.101 g (0.00037 mol) of potassium persulfate was added and dissolved therein, thereby preparing a monomer aqueous solution for the second polymerization. The monomer aqueous solution had a mass of 91.0 g of the water-soluble ethylenically unsaturated monomer and a moisture amount of 115.7 g.

The reaction mixture after the first reversed phase suspension polymerization (after the crosslinking reaction) was cooled to 60° C. (state where sorbitan monolaurate is dissolved in n-heptane) with the stirrer set to the rotation frequency of 1000 r/min. The monomer aqueous solution for the second polymerization adjusted to 14° C. was dropwise added to the system. While the temperature was maintained at the system temperature when the dropwise addition was completed (47° C.), the system was stirred at the above rotation frequency and replaced with nitrogen gas for 30 minutes. Then, the system was heated by immersion in a water bath at 70° C. The second reversed phase suspension polymerization was carried out for one hour, thereby preparing a water-absorbent resin precursor.

(Post Crosslinking Reaction)

The liquid containing the resulting water-absorbent resin precursor was heated in an oil bath at 120° C. Water and n-heptane were azeotroped while n-heptane was refluxed, thereby extracting 196.9 g of water outside the system. Then, 7.36 g of a 2% by mass ethylene glycol diglycidyl ether aqueous solution (0.00085 mol) was added as a post crosslinking agent. The moisture amount at that time was 74.6 g and the moisture content relative to the water-soluble ethylenically unsaturated monomer component in the water-absorbent resin precursor was 37% by mass. The post crosslinking agent mixture prepared was held at 80° C. for two hours. Then, n-heptane was evaporated for drying, so that 190.5 g of granular water-absorbent resin particles was prepared.

Comparative Example 8

A similar operation as in Example 1 was performed, except that the amount of water to be extracted outside the system by azeotroping of water and n-heptane in the (Post crosslinking reaction) of Example 1 was changed from 197.3 g to 71.6 g (the moisture content relative to the water-soluble ethylenically unsaturated monomer component in the water-absorbent resin precursor was 110% by mass). In this manner, 191.0 g of granular water-absorbent resin particles was prepared.

(Evaluation)

The water-absorbent resin particles each obtained in the examples and comparative examples were evaluated as follows. Table 1 shows the results.

(1) Saline Retention Capacity of Water-Absorbent Resin Particles

To 500 g of a 0.9% by mass salt solution (saline) in a 500-mL beaker, 2.0 g of water-absorbent resin particles was dispersed with stirring at 600 r/min such that undissolved lumps were not formed. The solution was left for 30 minutes under stirring at the above frequency so that the water-absorbent resin particles were sufficiently swelled. Then, the solution was poured into a cotton bag (cotton broad No. 60, 100 mm in width×200 mm in length) and the top thereof was fastened with a rubber band. The cotton bag was dehydrated for a minute using a dehydrator (KOKUSAN CO., LTd., item No: H-122) in which the centrifugal force was set to 167 G. The mass Wa (g) of the cotton bag containing a swelled gel after dehydration was measured. Separately, a similar operation was performed without addition of water-absorbent resin particles and the empty mass Wb (g) of the wet cotton bag was measured. The water retention capacity was calculated using the following equation.

$$\text{(Saline retention capacity of water-absorbent resin particles)}(g/g) = [Wa - Wb](g)/(\text{mass of water-absorbent resin particles})(g)$$

(2) Saline Absorption Rate of Water-Absorbent Resin Particles

The test was carried out in a room adjusted to a temperature of 25±1° C. Into a 100-mL beaker containing 50±0.1 g of saline, a magnetic stirrer bar (8 mmφ×30 mm without ring) was placed. The beaker was immersed in a constant-temperature water bath and the liquid temperature was controlled to 25±0.2° C. Then, the beaker was placed on a magnetic stirrer and a vortex was generated by stirring at a rotation frequency of 600 r/min. Then, 2.0±0.002 g of water-absorbent resin particles were rapidly added to the beaker. The time (seconds) from addition of the water-absorbent resin particles to settlement of the vortex was measured using a stop watch. The measured time was regarded as the water absorption rate of the water-absorbent resin particles.

(3) Median Particle Size of Water-Absorbent Resin Particles

An amount of 100 g of the water-absorbent resin particles was mixed with 0.5 g of amorphous silica (Evonik Degussa Japan Co., Ltd., trade name: Sipernat 200) as a lubricant.

The water-absorbent resin particles were passed through a JIS standard sieve with an aperture of 250 μm. The median particle size was measured using sieves of combination (A) in the case of 50% by mass or more of throughput, and using sieves of combination (B) in the case of less than 50% by mass of throughput:

(A) A combination of a sieve (JIS standard sieve, being the same hereinafter) with an aperture of 425 μm, a sieve with an aperture of 250 μm, a sieve with an aperture of 180 μm, a sieve with an aperture of 150 μm, a sieve with an aperture of 106 μm, a sieve with an aperture of 75 μm, a sieve with an aperture of 45 μm, and a tray stacked in this order from the top; and (B) A combination of a sieve (JIS standard sieve, being the same hereinafter) with an aperture of 850 μm, a sieve with an aperture of 600 μm, a sieve with an aperture of 500 μm, a sieve with an aperture of 425 μm, a sieve with an aperture of 300 μm, a sieve with an aperture of 250 μm, a sieve with an aperture of 150 μm, and a tray stacked in this order from the top. The water-absorbent resin particles were put onto the topmost sieve of the combination and classified by shaking for 20 minutes using a ro-tap shaker.

After classification, the mass of the water-absorbent resin particles remaining on each sieve was calculated as a mass percentage relative to the total amount. The calculated values were integrated in descending order of the particle size. The relation between the aperture of the sieve and the integrated value of the mass percentage of the water-absorbent resin particles remaining on the sieve was plotted on a logarithmic probability paper. The plotted points on the probability paper were joined by straight lines. The particle size corresponding to 50% by mass of the integrated mass percentage was regarded as the median particle size.

(4) Equilibrium Swelling Capacity of Water-Absorbent Resin Particles

The equilibrium swelling capacity after 10 minutes from the absorption start was measured using a swelling capacity measuring apparatus. FIG. 1 shows a schematic explanatory view of the swelling capacity measuring apparatus. A swelling capacity measuring apparatus X shown in FIG. 1 includes a moving distance measuring means 1, a concave circular cup 2 (30 mm in height, inner diameter of 80.5 mm), a plastic convex circular cylinder 3 (external diameter of 80 mm, 60 pieces of through holes 7 with a diameter of 2 mm were equally spaced on a contact face with the water-absorbent resin particles), and a nonwoven fabric 4. The swelling capacity measuring apparatus X can measure the displacement in 0.01 mm units using laser light 6. The concave circular cup 2 can uniformly disperse a predetermined amount of water-absorbent resin particles. The convex circular cylinder 3 can apply a load (90 g) onto the water-absorbent resin particles 5 uniformly.

An amount of 0.1 g of a test sample (water-absorbent resin particles 5) was uniformly dispersed in the concave circular cup 2 and the nonwoven fabric 4 was placed thereon. The convex circular cylinder 3 was placed on the nonwoven fabric 4 gently such that the laser light 6 from the sensor in the moving distance measuring means 1 aims at the center portion of the cylinder. An amount of 130 g of ion exchange water preliminary adjusted to 20° C. was poured into the concave circular cup 2, and a moving distance of the convex circular cylinder 3 pushed up by the swollen water-absorbent resin particles 5 was measured. The moving distance of the convex circular cylinder 3 after 10 minutes from the absorption start was regarded as the equilibrium swelling capacity.

TABLE 1

|  | Saline absorption rate [sec] | Equilibrium swelling capacity [mm] | Median particle size [μm] | Saline retention capacity [g/g] |
| --- | --- | --- | --- | --- |
| Example 1 | 2 | 14.5 | 165 | 41 |
| Example 2 | 2 | 14.0 | 155 | 39 |
| Example 3 | 3 | 13.8 | 138 | 45 |
| Example 4 | 2 | 13.6 | 160 | 45 |
| Example 5 | 3 | 14.4 | 280 | 42 |
| Example 6 | 3 | 13.0 | 145 | 50 |
| Example 7 | 3 | 13.2 | 155 | 48 |
| Comparative Example 1 | 2 | 8.4 | 150 | 68 |
| Comparative Example 2 | 2 | 9.7 | 220 | 40 |
| Comparative Example 3 | 2 | 7.6 | 160 | 62 |
| Comparative Example 4 | — | — | — | — |
| Comparative Example 5 | 6 | 9.5 | 70 | 40 |
| Comparative Example 6 | — | — | — | — |
| Comparative Example 7 | 4 | 9.3 | 281 | 45 |
| Comparative Example 8 | 2 | 8.0 | 145 | 58 |

As shown in Table 1, the water-absorbent resin particles obtained in Examples 1 to 7 each showed an excellent water absorption rate and high equilibrium swelling capacity, and had an appropriate median particle size. In contrast, the water-absorbent resin particles obtained in the comparative examples failed to achieve a sufficient water absorption rate or swelling capacity.

INDUSTRIAL APPLICABILITY

The water-absorbent resin particles of the present invention are usable in various fields such as sanitary items (e.g., disposable diapers, feminine hygiene products, pet sheets), agricultural and horticultural materials (e.g., water-retaining materials, soil conditioners), and industrial materials (e.g., water-blocking materials for power and communication cables, dewfall preventing materials). Especially, the water-absorbent resin particles of the present invention are suitably used for industrial materials such as water-blocking materials for power and communication cables.

BRIEF DESCRIPTION OF DRAWINGS

1 Moving distance measuring means
2 Concave circular cup
3 Convex circular cylinder
4 Nonwoven fabric
5 Water-absorbent resin particles
6 Laser light
7 Through hole
X Swelling capacity measuring apparatus

The invention claimed is:

1. A method for producing water-absorbent resin particles by reversed phase suspension polymerization of a water-soluble ethylenically unsaturated monomer, the method comprising the steps of:

(A) first reversed phase suspension polymerization of a water-soluble ethylenically unsaturated monomer in a petroleum hydrocarbon dispersion medium using a water-soluble radical polymerization initiator, in the absence of an internal crosslinking agent and in the presence of a surfactant having an HLB of 8 to 12;

(B) intermediate crosslinking reaction by adding an intermediate crosslinking agent;

(C) second reversed phase suspension polymerization of a water-soluble ethylenically unsaturated monomer added to the petroleum hydrocarbon dispersion medium containing the surfactant dissolved therein using a water-soluble radical polymerization initiator in the absence of an internal crosslinking agent, thereby producing a water-absorbent resin precursor; and (D) post crosslinking reaction of the water-absorbent resin precursor preliminary adjusted to have a moisture content of 30 to 100% by mass relative to a water-soluble ethylenically unsaturated monomer component in the water-absorbent resin precursor.

2. The method for producing water-absorbent resin particles according to claim 1, wherein the surfactant having an HLB of 8 to 12 is at least one compound selected from the group consisting of a sorbitan fatty acid ester, a polyglycerol fatty acid ester, and a sucrose fatty acid ester.

3. The method for producing water-absorbent resin particles according to claim 1, wherein the intermediate crosslinking agent is a glycidyl ether compound.

4. The method for producing water-absorbent resin particles according to claim 1, wherein the amount of the intermediate crosslinking agent added is 0.0001 to 0.026 mol % relative to the total molar amount of the water-soluble ethylenically unsaturated monomers.

5. Water-absorbent resin particles produced by the method for producing water-absorbent resin particles according to claim 1.

6. The water-absorbent resin particles according to claim 5, wherein the water-absorbent resin particles have equilibrium swelling capacity of 12 to 28 mm, a water absorption rate of 1 to 5 seconds, saline retention capacity of 20 to 60 g/g, and a median particle size of 100 to 400 μm.

* * * * *